United States Patent [19]

Stavrinou

[11] 4,105,593

[45] Aug. 8, 1978

[54] METHOD OF RECLAIMING WASTE SHEET FLOORING

[75] Inventor: Stavros C. Stavrinou, Lancaster, Pa.

[73] Assignee: Armstrong Cork Company, Lancaster, Pa.

[21] Appl. No.: 814,129

[22] Filed: Jul. 8, 1977

[51] Int. Cl.² .............................................. C08J 11/04
[52] U.S. Cl. .................................................... 260/2.3
[58] Field of Search ........................................ 260/2.3

[56] References Cited

U.S. PATENT DOCUMENTS

| | | | |
|---|---|---|---|
| 3,873,474 | 3/1975 | Ficker | 260/2.3 |
| 3,912,664 | 10/1975 | Wainer | 260/2.3 |
| 3,954,681 | 5/1976 | Castle | 260/2.3 |
| 3,983,087 | 9/1976 | Tucker et al. | 260/2.3 |
| 4,020,020 | 4/1977 | Appleyard et al. | 260/2.3 |
| 4,028,288 | 6/1977 | Turner | 260/2.3 |

*Primary Examiner*—Carman J. Seccuro

[57] ABSTRACT

Scrap sheet floor covering is recovered for reuse through the use of a Henschel mixer. The mixer grinds the prediced scrap in the presence of a plasticizer to separate the asbestos containing backing material from the vinyl layer. The resultant blended mix can then be used as a raw material in the manufacture of fiber-filled vinyl tile.

2 Claims, 1 Drawing Figure

U.S. Patent   Aug. 8, 1978   4,105,593
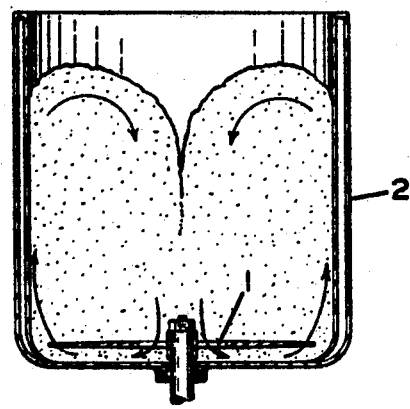

METHOD OF RECLAIMING WASTE SHEET FLOORING

BACKGROUND OF THE INVENTION

1. Field of the Invention

The invention relates to a process for the treatment of waste sheet floor covering material for the purpose of converting it into raw material to be used in the manufacture of fiber reinforced tile floor material.

2. Description of the Prior Art

U.S. Pat. Nos. 3,056,224 and 3,887,678 disclose a sheet vinyl floor covering material which has an asbestos containing backing material fastened to a vinyl wear layer material.

U.S. Pat. No. 2,773,851 discloses vinyl composition for making a vinyl tile made with filler material.

U.S. Pat. No. 3,836,486 discloses an invention related to the reclamation or recovery of vinyl chloride polymer compositions from scrap plastics.

U.S. Pat. No. 3,027,599 discloses another patent relating to a method of recovering scrap to make a new article.

Finally, U.S. Pat. No. 4,020,020 is Applicant's patent on the recovery of scrap sheet floor through the use of a Banbury mixer. A Banbury mixer is a shear mixer but does not produce the same high degree shear stress that a Henschel mixer will produce. The Banbury mixer masticates the floor covering material under pressure and, after a period of mixing, the raw materials are added to the Banbury mixer and further mixing is carried out. This then results in a mix which can then be further used in another mix to form a floor tile. In the invention herein, a plasticizer is utilized in the initial masticating stage and assists in the separation of the felted fibrous backing from the non-fibrous resin surface. This particular masticating step can not be carried out in a Banbury mixer to give the desired result and must be carried out in a Henschel mixer which generates a high shear stress and moves the mix in a continuous circular path due to centrifugal action. The Henschel mixer is not a mixer that operates under a pressure such as does the Banbury mixer.

SUMMARY OF THE INVENTION

The invention is directed to a process of recovering scrap sheet flooring material such as that shown in U.S. Pat. No. 3,056,224. A Henschel mixer is used to grind prediced scrap in the presence of a plasticizer. The plasticizer helps to break the bond between the wear layer and the felted fibrous backing. It also wets down the total batch and thus eliminates asbestos dust which will be generated during the grinding of the felted backing. The resulting mix is then discharged and may be utilized as part of the raw material used to make vinyl tile such as that shown in U.S. Pat. No. 2,773,851.

BRIEF DESCRIPTION OF THE DRAWING

The drawing is a schematic sectional representation of a Henschel blender.

DESCRIPTION OF THE PREFERRED EMBODIMENT

Normally, the sheet flooring material of U.S. Pat. No. 3,056,224 or U.S. Pat. No. 3,887,678, if it was defective, would be scrapped and dumped in a land fill dump. Defects of the nature being talked about are visual defects in the arrangement or lay-up of the design of the flooring which would give an unpleasant aesthetic effect. Because the design layer, which is a resin layer, is fastened to the backing, which is a beater saturated asbestos fiber felt, it was not considered feasible in the past to attempt to salvage scrap material. Several investigations were conducted relative techniques of removing the backing material from the vinyl face of the flooring, but invariably, these techniques involved high expense or other production problems. Through the technique to be described below, it is now possible to take scrap sheet flooring material, such as disclosed in U.S. Pat. No. 3.056,224 and recover the scrap material for use in another product.

The process herein is improvement over the process of U.S. Pat. No. 4,020,020. The process herein has been particularly used with polyurethane coated floor covering materials, such as that disclosed in U.S. Pat. No. 3,887,678. The process herein also has the advantage over the prior art processes in that it may be used to recover scrap felted backing material in addition to finished scrap floor covering material.

The recovered scrap material will be used to form a product such as that disclosed in U.S. Pat. No. 2,773,851. The product of that patent is a vinyl resin floor tile which contains filler material. The recovered scrap, processed by the invention to be described below, will be used as part of the raw material for forming the product of U.S. Pat. No. 2,773,851 and the asbestos fiber of the backing of the product shown in U.S. Pat. No. 3,056,224 will constitute part of the fibrous filler in the product of U.S. Pat. No. 2,773,851. Of primary importance herein is the fact that the recovered scrap replaces some of the virgin material which normally would be needed.

That scrap material of a structure according to U.S. Pat. No. 3,056,224 will initially be in sheet form of 6 feet or 12 feet widths and of variable lengths. The sheets will be run through a conventional dicing machine and converted to diced ¼ inch (0.6 centimeter) by ¼ inch (0.6 centimeter) square cubes, each cube having basically the cross-sectional structure shown in FIG. 3 of U.S. Pat. No. 3,056,224. It is also possible that the cubes could have a polyurethane wear coat such as that disclosed in U.S. Pat. No. 3,887,678. Basically, each cube will have at least on one side the asbestos backing material and adhered thereto some vinyl material which forms the decorative layer of the flooring. These cubes will be charged into a conventional Henschel mixer. The Henschel mixer is a high intensity mixer such as that shown in the drawing and is used for blending simple mixtures and pasty compositions prior to extrusion and for prefoaming expandable styling. Often called a vortical intense blender, it has a high speed blade driven from the bottom of the mixer. Heat is generated very fast from the high work input. In this mixer, the charge is continuously and rapidly circulated by a centrifugal action between closely spaced rotating and stationary surfaces. The bottom pitched rotor has a peripheral velocity of 130 feet per second. This produces a high shear stress and blade impact for reducing the chips and gaining intimate ingredient dispersion. Jacketed coolers are offered since quick cooling is often a requirement after the high intensity mixing. As shown in the drawing, the machine basically comprises a rotor 1 which is mounted for rotation within a container 2. The rotor is positioned closely adjacent the bottom of the container, the centrifugal action of the rotor creates a rapid and continuous flow of the mix charged through the rotor blades. The high impact velocity of the rotor blades and their shear action break up particles and cause intimate dispersion of all ingredients. The centrifugal rotation of the mix is shown in the drawing. The mix passes between the rotor blades and then up around the outside of the rotor blades along the wall of the container. After the chips are prediced, they are charged into the Henschel blender. Normally, 180 pounds of diced material will have added thereto 20 pounds of a plasticizer. At this point the mixer is turned on and operated at a peripheral velocity of 130 feet per second. Mixing is carried on from 5 to 8 minutes and the mixer is water cooled to help keep the heat down within the mixer. The mix rises to a temperature of about 200° F. After the blending, the resulting mix is discharged into a suitable container for incorporation into a tile product. The presence of the plasticizer during the mixing helps to break the bond between the vinyl layer and the felted fiber backing. It also wets the total batch down and eliminates asbestos dust which is generated when the backing is ground up.

The recovered scrap can be utilized in the process of U.S. Pat. No. 2,773,851 to form a portion of the formula for the product of that patent. A specific mix which can be made up to form a product similar to that of U.S. Pat. No. 2,773,851 is set forth below:

| Material | Pounds |
| --- | --- |
| Asbestos (hydrous magnesium silicate) | 40 |
| Limestone (calcium carbonate) | 155 |
| Asbestos | 25 |

-continued

| Material | Pounds |
| --- | --- |
| Plasticizer (butyl-benzyl-phthalate) | 5.5 |
| Resin (hydrocarbon) | 6.9 |
| Resin (P.V.C.-P.V.A. copolymer) | 25 |
| Stabilizer (Combination of melamine and metal stearates) | 2.6 |
| Recovered Scrap | 40 |
| Pattern Remix* | 600 |
| | 900.0 |

*Pattern remix is scrap from the previous tile forming run and is, in effect, the scrap that exists after one sheets out a sheet and then cuts tiles out of it. The scrap will have the same formulation as the above material.

This above information is then used in the process of U.S. Pat. No. 2,773,851 to form a floor tile.

What is claimed is:

1. A process for recovering scrap sheet floor covering material which is composed of at least a felted fibrous backing cured to a non-fibrous resin surface, the steps comprise:
    a. dicing said scrap sheet floor covering to reduce it to small pieces,
    b. masticating the sheet floor covering pieces in the presence of a plasticizer with a high shear stress blender, moving the mix in the blender not under pressure in a continuous circular path due to centrifugal action, and breaking up the pieces of floor covering and dispersing all its ingredients, and
    c. discharging the resulting mix from the blender for use as part of a new mix which can be formed into a floor covering product.

2. The process for recovering scrap floor covering as set forth in claim 1 wherein said masticating of the fibrous backing and non-fibrous resinous surface is carried out in a Henschel blender for 5 to 8 minutes.

* * * * *